United States Patent [19]

Fentress et al.

[11] Patent Number: 4,478,486
[45] Date of Patent: Oct. 23, 1984

[54] FIBER OPTIC SPLICE ORGANIZER

[75] Inventors: Vernon A. Fentress, Castro Valley; Francois Comet, Belmont, both of Calif.

[73] Assignee: Raychem Corporation, Menlo Park, Calif.

[21] Appl. No.: 407,670

[22] Filed: Aug. 12, 1982

[51] Int. Cl.³ .............................................. G02B 5/14
[52] U.S. Cl. ............................ 350/96.20; 350/96.15; 350/96.21
[58] Field of Search ............... 350/96.15, 96.20, 96.21

[56] References Cited

U.S. PATENT DOCUMENTS

| 3,455,336 | 11/1965 | Ellis | 138/156 |
| 4,177,446 | 12/1979 | Diaz | 338/212 |
| 4,223,209 | 9/1980 | Diaz | 219/549 |
| 4,266,853 | 5/1981 | Hutchins et al. | 350/96.20 |
| 4,355,863 | 10/1982 | Aulich et al. | 350/96.15 |
| 4,373,777 | 2/1983 | Borsuk et al. | 350/96.20 |
| 4,428,645 | 1/1984 | Korbelak et al. | 350/96.20 |

FOREIGN PATENT DOCUMENTS

| 43570 | 1/1982 | European Pat. Off. | 350/96.20 |
| 3006131 | 9/1981 | Fed. Rep. of Germany | 350/96.20 |
| 52-29235 | 4/1977 | Japan | 350/96.20 |
| 55-84905 | 6/1980 | Japan | 350/96.20 |
| 55-100504 | 7/1980 | Japan | 350/96.20 |
| 55-127507 | 10/1980 | Japan | 350/96.20 |
| 57-108815 | 7/1982 | Japan | 350/96.20 |

Primary Examiner—William L. Sikes
Assistant Examiner—Brian M. Healy
Attorney, Agent, or Firm—Herbert G. Burkard; T. Gene Dillahunty; Dennis E. Kovach

[57] ABSTRACT

A method and device for organizing the bight of an optical fiber and the like at a splice or slack point is provided. The method comprises laying the bight on a sheet in such a fashion that, when the sheet is wrapped about itself (and, generally, about a cylindrical core) in a spiral fashion, the radius of any bend in the fiber is greater than the minimum bending radius; and wrapping the sheet about itself (and the core). The method is suitable for both in-line and butt splices between fiber optic cables, and a ready means of encapsulation is also provided.

37 Claims, 5 Drawing Figures

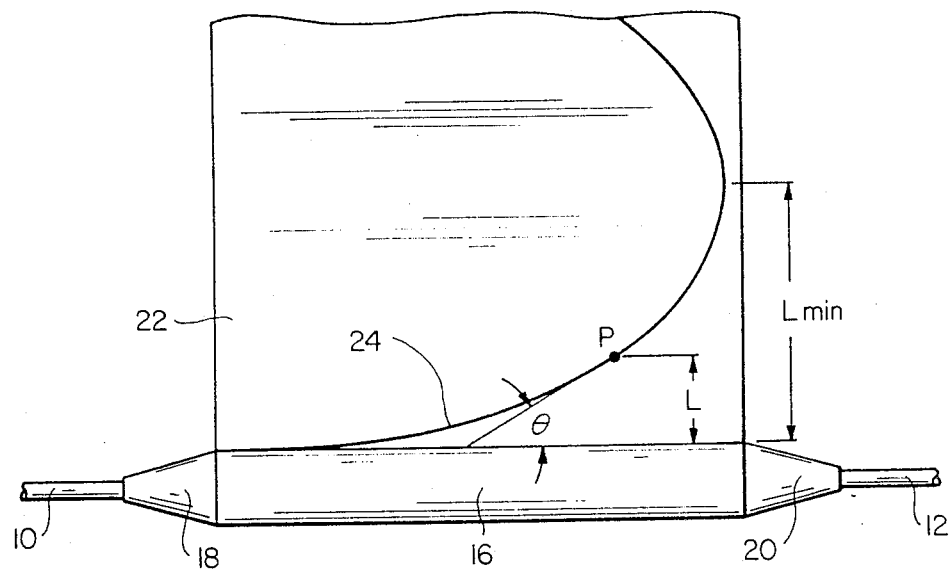
FIG_1
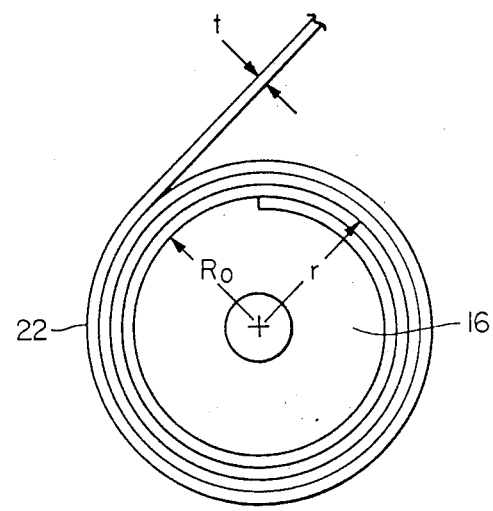
FIG_2

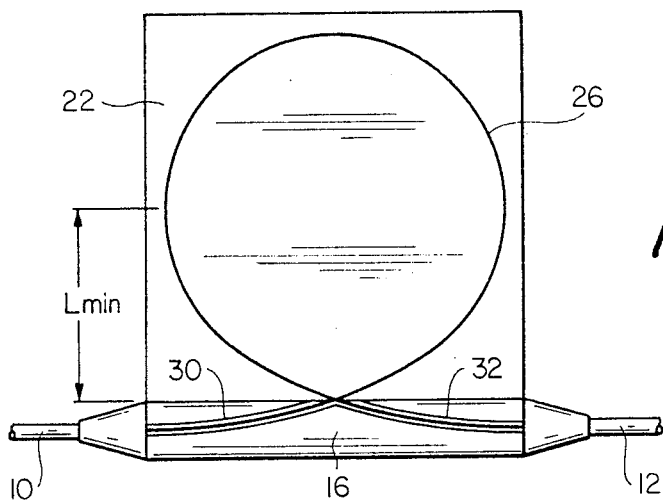
FIG._3
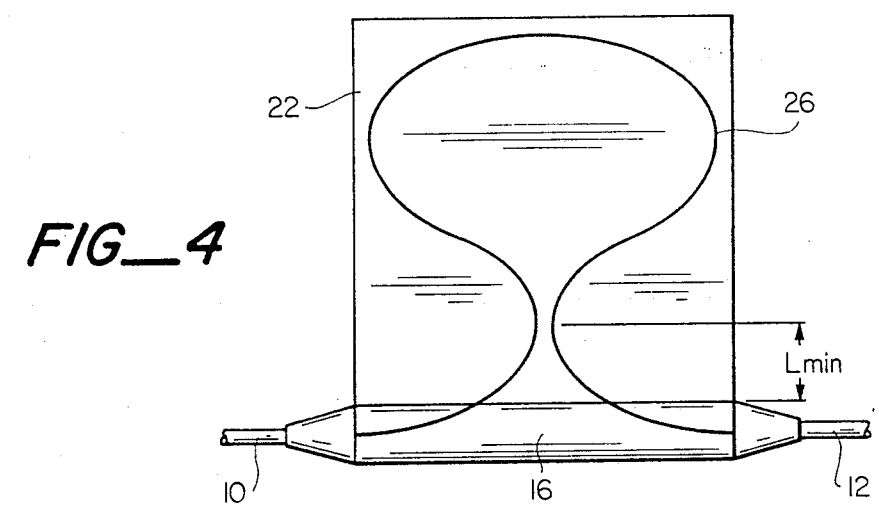
FIG._4
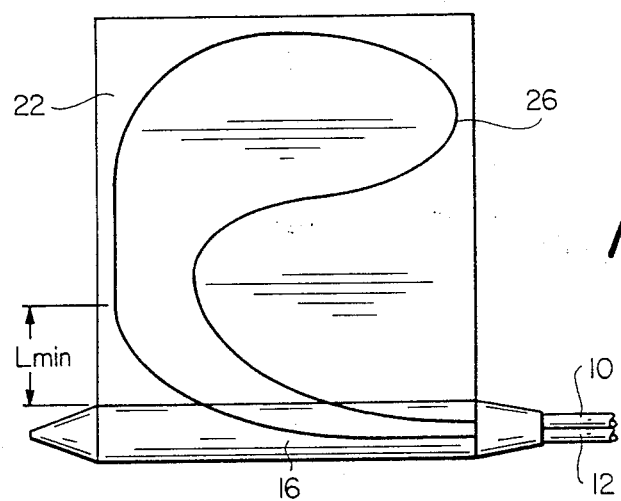
FIG._5

FIBER OPTIC SPLICE ORGANIZER

BACKGROUND OF THE INVENTION

1. Field of the Invention

This invention relates to a device and method for organizing optical fibers and the like at splice or slack points, and to the joining of fiber optic cables.

2. Background of the Invention

The handling of optical fibers requires special care. This is particularly true in splice enclosures. Due to their size, which can be as small as 0.2 mm in diameter, the handling of fibers is a problem. Transmission capabilities will be impaired if a fiber is bent beyond the critical radius, the point at which light is no longer totally contained in the core of the fiber. Furthermore, fibers are brittle and will break if bent beyond a minimum bending radius. The minimum bending radius here refers to that radius below which the probability of breakage of the fiber within a given time becomes high. Unconventional methods for the handling and storage of fibers must therefore be devised. While glass and silica (the materials used to make optical fibers) are in some respects stronger than steel, fibers normally do not possess this potential strength because of microscopic surface fractures which are vulnerable to stress and spread, causing the fiber to break easily. Thus the take-up of fiber slack (a bight in a fiber) in a closure presents a problem for multi-fiber cables, where individual fiber joints are required to facilitate rearrangements and repairs. Another problem is that of identifying individual fibers. In large multi-fiber cables each fiber must be readily identifiable for subsequent testing and repairs. Unlike copper where the insulation may be color coded, coding is difficult with individual optical fibers.

In an attempt to mitigate these problems, a standard splice enclosure with a central transverse bulkhead has been used. The individual fibers are spliced and are attached to the bulkhead for support. A disadvantage of this approach is that storage of slack in the fibers is not provided for. Furthermore, each of the fibers must be individually tagged for indentification purposes.

Another approach uses a ribbon type optical fiber arrangement where twelve fibers are fixed together side by side. Twelve of these ribbons are then stacked one on top of another to obtain a cable containing 144 individual fibers. The fibers are bulk spliced using an epoxy technique and the cable is placed in a standard splice enclosure. Disadvantages of the above approach are the lack of access to individual fibers and, again, no slack storage. A single fiber failure is impossible to repair, and the fiber must be taken out of service.

In other splicing arrangements all the fibers in a cable are looped within the same retainer or fiber slack is stored on spools. In either case identification, repair or splice work of individual fibers is extremely difficult without a major shuffle in the splice enclosure. This is undesirable as transmission capability can be affected in working fibers as they are moved.

Hutchins U.S. Pat. No. 4,226,853, describes an organizing device for optical fibers which comprises a plurality of stacked tray-like supports having partially turned-up edges, with each separately hinged at one side thereof to a carrier. Each tray-like support is adapted to retain a looped fiber portion, and has a width at least equal to twice the minimum bending radius specified for that fiber.

Fiber optic communications cables generally include some form of strength and/or sheath member to carry the strain involved in installing the cables in ducts or laying them underwater, since the fibers are not capable of bearing such strains themselves. When two fiber optic cables are spliced there should, therefore, be means provided at the splice to transfer the strain from one cable strength member to the other cable strength member.

In U.S. Patent Application Ser. Nos. 339,275 filed Jan. 15, 1982 and 381,825 filed May 25, 1982, which are assigned to the assignee of the present application and which are incorporated herein by reference, there is disclosed a device and method for organizing a bight in an optical fiber, such as at a splice between two fiber optic cables. The method comprises wrapping the bight about a cylindrical core to form a helix or a pair of helices of opposite handedness.

The technique described in those applications has the advantage that the radius of the core can be less than the minimum bending radius of the fiber while still allowing storage of fiber in such a way that it is bent through a radius greater than the minimum bending radius. A disadvantage, however, is that when the core radius is small, an undesirably long core may be required to store an adequate length of fiber. A further disadvantage is that the technique is not readily applicable to butt splicing of fiber optic cables, but only to in-line splicing.

DESCRIPTION OF THE INVENTION

Summary of the Invention

According to one aspect of this invention there is provided a device and method for organizing a bight in an optical fiber so as to both minimize the diameter of a container necessary to enclose that bight and maximize the radius through which such fiber is bent, which method comprises laying out said bight on a sheet in such a fashion that, when the sheet is wrapped about itself, the radius of any bend in the fiber is greater than the minimum bending radius; and wrapping the sheet about itself.

According to another aspect of this invention there is provided a device and method for splicing two fiber-optic cables each containing at least one optical fiber so as to both minimize the size of the splice and maximize the radius through which each fiber is bent while still allowing sufficient slack for easy joining of the fibers.

According to a further aspect of this invention there is provided a device and method for organizing optical fibers at a splice or slack point so as to render them capable of easy identification and access while both minimizing the size of a container necessary to enclose such fibers and maximizing the radius through which each such fiber is bent.

According to yet another aspect of this invention there is provided a device and method for the ready encapsulation of optical fibers at a splice or slack point.

BRIEF DESCRIPTION OF THE DRAWING

FIG. 1 shows a partial layout of an optical fiber on an embodiment of the organizer of this invention.

FIG. 2 is a cross-section through an organizer according to this invention.

FIGS. 3, 4 and 5 show some possible layouts of optical fibers on organizers according to this invention, where FIGS. 3 and 4 refer to in-line splices and FIG. 5 to a butt splice.

DETAILED DESCRIPTION OF THE INVENTION

This invention comprises the laying out of a bight in an optical fiber on a sheet in such a fashion that, when the sheet is wrapped about itself (and, generally, about a cylindrical core) in a spiral fashion, the radius of any bend in the fiber is greater than the minimum bending radius; and wrapping the sheet about itself (and the core).

Mathematically expressed, if the minimum bending radius of the fiber is $R_{min}$, and the radius of the substrate about which it is wrapped is r (this may represent the core, the wrapped sheet, or core and wrapped sheet, as appropriate), then the angle $\theta$ of the fiber relative to the axis of the substrate needed to ensure that the bend radius exceeds $R_{min}$ is given by:

$$\theta < \sin^{-1}(r/R_{min})$$

for r less than $R_{min}$ (the symbols are illustrated in the Figures). $\theta$ is then 0° for r=0, and 90° for r=$R_{min}$; so that once r exceeds $R_{min}$, the bending limits on the fiber are not imposed by the fact that it is wrapped, but rather by the bend radius laid out flat on the sheet.

If the sheet is of thickness t, and the wrap has a starting radius $R_o$ (less than $R_{min}$), then the length of the sheet wrapped to give a radius r is:

$$L = [\pi(r^2 - R_o^2)]/t$$

From these, the layout configuration of the fiber on the sheet may be determined so that the minimum bending radius is always exceeded.

Once r exceeds $R_{min}$, there are no constraints on the angle $\theta$, but the bend radius of the fiber when laid out on the sheet must always exceed $R_{min}$. Subject only to that requirement, as much fiber as desired may be laid out on the sheet in any suitable fashion, and it is this ability to store fiber that is particularly advantageous when compared to U.S. Patent Application Ser. Nos. 339,275 and 381,825 referred to previously.

The sheet on which the fiber to be organized is laid out should be flexible to enable the spiral wrapping and, when the core (if any) has a radius less than the minimum bending radius of the fiber, will generally be of a sufficient thickness that the radius of the wrapped sheet exceeds the minimum bending radius when only a relatively small number of wraps have been made, for convenience. The sheet need not be of uniform thickness, though a sharp change in thickness is undesirable due to the bending induced in a fiber lying on that sheet, and may be quite thin when the radius of the wrapped sheet exceeds the minimum bending radius.

The material of the sheet may be slightly adhesive to facilitate handling of the optical fiber on the sheet and may comprise, for example, a polymeric foam to provide cushioning for the fiber. The sheet may, if desired, have a thinner portion to accommodate the fiber and any connection therein. Guides to aid the placement of the fiber may be provided on the sheet while indicia may be placed on the sheet or the sheet colored over at least a part of its surface to identify the fiber (or fibers) associated therewith. The sheet may be transparent to enable visualization of the (wrapped) fiber(s).

The sheet may, if of a suitable thickness, be provided with grooves to receive the fiber. In cases where encapsulation of the fibers (such as with a water-excluding jelly or the like) is desired, the use of a sheet comprising two laminae is especially valuable. The two laminae are joined along lines forming a tube, and one lamina is cut so as to slit open the tube. The spliced fiber may then be placed into the tube through the cut, and the cut closed, e.g. by the use of a line of adhesive tape over the cut. The tube may then be filled with the encapsulant, which may be "massaged" along the tube to completely fill it and exclude air. Alternatively, the sheet may be coated with the encapsulant.

It will be readily apparent that more than one fiber may be placed upon a sheet and/or more than one sheet may be attached to a core so that a plurality of fibers may be organized. The use of multiple sheets offers the advantage that individual fibers may be conveniently accessed with minimum disturbance to other fibers, and identifying indicia may be placed on the sheets to simplify fiber identification. Further, a plurality of cores may be used, especially when the number of fibers to be organized is large.

Although the use of a core is not a requisite of this invention, it offers the advantage of simplicity, by, inter alia, providing an attachment point for the sheet or sheets to be wrapped; and the invention will be discussed further with reference to the use of a core.

The core may be made of any suitable material, for example, metal or rigid plastic, and may have a cushioning layer on its outer surface and tapered regions of such a shape that the fiber does not undergo a bend of radius less that the minimum bending radius in passing over them.

The use of the term "cylindrical" to describe the core is not intended to limit the cross-section to being circular. However, it should be noted that a circular cross-section affords the maximum bending radius for a given transverse dimension, and is thus generally preferred. The core need not be solid, nor indeed unitary, and split, composite, and/or hollow cores may be preferred for ease of use. A split core, for example, may be fitted over the joined strength or sheath members of two fiber-optic cables for use.

The assembly, once wrapped, may then be enclosed by any means considered desirable, such as the use of a conventional telecommunication cable splice case and/or a recoverable polymeric sleeve, such as are well-known in the art. A protective liner may be used over the wrapped assembly for additional protection, if desired.

A recoverable sleeve may be tubular or be a wrap-around, such as for example the product described in U.S. Pat. No. 3,455,336, and may be heat-recoverable. A heat-recoverable sleeve may be externally heated, such as with a gas torch, or may contain integral heating means, such as for example those described in U.S. Pat. Nos. 4,177,446 and 4,223,209. These three patents are incorporated herein by reference.

A slack point may be taken up in the same way as a splice and this offers the ability to create easy access points to a fiber optic cable.

Particular advantages of the method include (i) the ability to easily connect the strength or sheath members to form a rigid splice without interfering with the organization of the fibers, (ii) the ability to use components similar or identical to those used for conventional telecommunications cable splices, and (iii) the small size of the resulting splice while still allowing a sufficient bight in the optical fibers for convenient connection.

FIGS. 1 and 2 illustrate the layout of the fiber on the sheet and the wrapping of that sheet about a core.

In FIG. 1, fiber optic cables 10 and 12 are shown entering an organizer comprising a core 16 having tapered end portions 18 and 20. A sheet 22 is attached to the core 16 along one edge. A portion of a single fiber 24 is shown laid out on the sheet 22. At a point P, the sheet length to that point is L and the angle between fiber 24 and the axis of core 16 is $\theta$. The radius of the wrapped assembly at that point, when sheet 22 is wrapped about core 16, is then r (FIG. 2), and the equations given earlier apply.

When L is $L_{min}$, R is $R_{min}$, and the fiber may then be perpendicular to the core axis without the bend radius being below $R_{min}$ when the sheet 22 is wrapped about itself and the core 16. In this instance, the core radius is $R_o$. If no core were present, $R_o$ would be essentially zero.

As stated above, when r exceeds $R_{min}$, $\theta$ is not constrained by the wrapping requirement, and FIGS. 3 to 5 show various ways of laying out fibers on a sheet.

In FIG. 3, a fiber 26 is shown running from cable 10 to cable 12. It is laid out on the sheet 22 such that, when the sheet 22 is wrapped about the core 16, the bend radius always exceeds $R_{min}$. Here grooves 30, 32 have been cut in the core 16 to simplify laying out the fibers.

FIG. 4 shows an alternative method of laying out the fibers. Again, a fiber 26 is shown laid out on sheet 22. Both FIGS. 3 and 4 shows situations useful for in-line splices or the creation and takeup of a slack point in a fiber optic cable.

FIG. 5 shows the situation where cables 10 and 12 are butt-spliced and illustrates how a fiber 26 may still be organized by this invention.

It can be seen from these Figures that once L exceeds $L_{min}$, any suitable layout configuration may be chosen, so that a large fiber bight may conveniently be organized. Multiple sheets may, of course, be used if desired, as explained above; and if the number of fibers is sufficiently large, multiple cores may be used per splice, though neither of these features has been illustrated here.

While this invention has been described in detail with respect to certain preferred embodiments thereof it is evident that there may be a number of changes, adaptations, and modifications which come within the province of those skilled in the art. However, it is intended that all such variations not departing from the spirit of this invention should be considered within the scope thereof, as limited solely by the appended claims, in which the singular includes the plural unless the context requires otherwise, and their reasonable equivalents.

We claim:

1. A method of organizing a bight between two points in an optical fiber, comprising the steps of:
   (a) laying said bight on a sheet in such a fashion that, when said sheet is wrapped about itself in a spiral fashion about a longitudinal axis, a radius of any bend in the fiber is greater than the minimum bending radius of said fiber and at least one cross-section taken through the wrapped sheet along a plane essentially perpendicular to said axis will intersect the fiber at at least two points; and
   (b) wrapping said sheet about itself in a spiral fashion in such a manner that an innermost turn of said wrapped sheet has a radius smaller than said minimum bending radius of said optical fiber.

2. The method of claim 1 which further comprises encapsulating said fiber.

3. The method of claim 1 wherein said sheet comprises a plurality of laminae, and said fiber is placed between a pair of said laminae.

4. The method of claim 3 which further comprises encapsulating said fiber by an encapsulant introduced between said pair of laminae.

5. The method of claim 1 wherein said sheet is provided with indicia to identify said fiber associated therewith.

6. The method of claim 1 wherein more than one fiber is organized.

7. The method of claim 6 wherein more than one sheet is employed.

8. The method of claim 7 wherein more than one fiber is arranged on at least one of said sheets.

9. A method of organizing a bight between two points in an optical fiber, comprising the steps of:
   (a) laying said bight on a sheet in such a fashion that, when said sheet is wrapped about itself and a cylindrical core in a spiral fashion about a longitudinal axis, a radius of any bend in the fiber is greater than the minimum bending radius of said fiber and at least one cross-section taken through the wrapped sheet along a plane essentially perpendicular to said axis will intersect the fiber at at least two points; and
   (b) wrapping said sheet about itself and said core in a spiral fashion, a radius of said cylindrical core being less than the minimum bending radius of said fiber.

10. The method of claim 9 wherein more than one fiber is organized.

11. The method of claim 9 which further comprises encapsulating said fiber.

12. The method of claim 9 wherein said sheet comprises a plurality of laminae, and said fiber is placed between a pair of said laminae.

13. The method of claim 12 which further comprises encapsulating said fiber by an encapsulant introduced between said pair of laminae.

14. The method of claim 9 wherein said sheet is provided with indicia to identify said fiber associated therewith.

15. The method of claim 9 wherein more than one fiber is organized.

16. The method of claim 15 wherein more than one sheet is employed.

17. The method of claim 16 wherein more than one fiber is arranged on at least one of said sheets.

18. A method of making a splice between two fiber optic cables, each cable comprising an optical fiber, which method comprises:
   (a) joining said optical fibers, thereby forming a bight:
   (b) providing a sheet sized to be usable for organizing said bight;
   (c) laying said bight on said sheet in such a fashion that, when said sheet is wrapped about itself in a spiral fashion about a longitudinal axis, a radius of any bend in the fiber is greater than the minimum bending radius of said fiber and at least one cross-section taken through the wrapped sheet along a plane essentially perpendicular to said axis will intersect the fiber at at least two points; and
   (d) wrapping said sheet about itself in a spiral fashion, an innermost turn of said wrapped sheet having a radius less than said minimum bending radius.

19. The method of claim 18 which further comprises covering said splice with an encasing means.

20. The method of claim 1 wherein said splice is a butt splice.

21. The method of claim 18 wherein said splice is an in-line splice.

22. A device for organizing a bight in an optical fiber, comprising:
(a) a cylindrical core having a radius less than the minimum bending radius of said fiber; and
(b) a sheet of flexible material, which sheet is attached longitudinally to said core along one edge and is spirally wrapped about said core and about a longitudinal axis, said fiber being arranged on said sheet in such a manner that a radius of any bend of the fiber is greater than said minimum bending radius of said fiber, a cross-section taken through said wrapped sheet along a plane essentially perpendicular to said axis intersecting said fiber at at least two points.

23. The device of claim 22 wherein said core is tapered at at least one end thereof.

24. The device of claim 22 wherein said sheet possesses indicia thereon to identify said fiber associated therewith.

25. The device of claim 22 wherein said sheet possesses guide lines thereon to aid the arrangement of said fiber thereon.

26. The device of claim 22 wherein a plurality of sheets are attached to said core.

27. The device to claim 22 wherein said sheet comprises a plurality of laminae.

28. The device of claim 22 wherein at least one pair of said laminae are fused to form a tube for receiving said fiber therein.

29. An optical fiber organizer kit having component parts capable of being assembled for organizing a bight in an optical fiber between two points thereof
(a) a cylindrical core of a length adapted to be inserted on an axis between said two points, the radius of said core being less than a minimum bending radius of said fiber; and
(b) a sheet of flexible material adapted to have said optical fiber arranged thereon and to be wrapped about said core and said axis in such a manner that a radius of any bend of the fiber is greater than said minimum bending radius of said fiber, a cross-section taken through said wrapped sheet along a plane essentially perpendicular to said axis intersects said fiber at at least two points.

30. A fiber optic cable splice kit having component parts capable of being assembled for forming a splice between two fiber optic cables, said cables each comprising an optical fiber surrounded by an outer jacket wherein a portion of the outer jacket is removed to expose said fiber, the kit comprising the combination of:
(a) a cylindrical core of a length adapted to be placed between the ends of the jacketed portions, of said cables and having a radius less than the minimum bending radius of said fiber;
(b) a sheet of flexible material adapted to have said optical fiber arranged thereon when said fiber has been joined, said sheet being wrapped about said core subsequent to arranging said fiber thereon, a radius of any bend of said fiber being greater than a minimum bending radius of said fiber subsequent to wrapping said sheet about said core, a cross-section taken through said wrapped sheet along a plane essentially perpendicular to an axis of said core intersecting said fiber at at least two points; and
(c) covering means for encasing said splice when said sheet has been wrapped about said core.

31. A splice between two fiber optic cables, each cable comprising an optical fiber and said optical fibers having been joined to form a bight, wherein said bight has been organized by being laid on a sheet in such a fashion that, when said sheet is wrapped about itself in a spiral fashion about a longitudinal axis, the radius of any bend in the fiber is greater than the minimum bending radius of said fiber and at least one cross-section taken through the wrapped sheet along a plane essentially perpendicular to said axis will intersect the fiber at at least two points, and said sheet has then been wrapped about itself in said spiral fashion subsequent to organizing said bight so that an innermost turn of said sheet has a radius of curvature less than said minimum bending radius of said fiber.

32. A splice between two fiber optic cables, each cable comprising an optical fiber and said optical fibers having been joined to form a bight, wherein said bight has been organized by being laid on a sheet in such a fashion that, when said sheet is wrapped about itself and a cylindrical core in a spiral fashion, the radius of any bend in the fiber is greater than the minimum bending radius of said fiber and at least one cross-section taken through the wrapped sheet along a plane essentially perpendicular to an axis of said core will intersect the fiber at at least two points, and said sheet has then been wrapped about itself and said core in said spiral fashion, said core having a radius less than said minimum bending radius of said fiber.

33. The splice of claim 32 wherein the radius of said core is less than the minimum bending radius of said fiber.

34. A method of organizing a bight between two points in an optical fiber, comprising the steps of:
(a) laying said bight on a sheet in such a fashion that, when said sheet is wrapped about itself in a spiral fashion about a longitudinal axis, a radius of any bend in the fiber is greater than the minimum bending radius of said fiber and an angle, $\theta$, said fiber forms with said longitudinal axis varies between a value less than 90° and a value greater than 90°; and
(b) wrapping said sheet about itself in said spiral fashion such that an innermost turn of said sheet has a radius of curvature less than said minimum bending radius of said fiber.

35. The method of claim 34, wherein said laying and wrapping steps are performed such that at all points on said sheet where a radius of curvature of said sheet is less than said minimum bending radius, $R_{min}$, of said fiber said angle, $\theta$, is maintained less than $\sin^{-1}(r/R_{min})$ where r is a radius of curvature of said sheet and $R_{min}$ is said minimum bending radius of said fiber.

36. The method of claim 35, wherein a length of said sheet wrapped is equal to $$L = [\pi(r_1^2 - R_o^2)]/t$$

where $r_1$ is an outermost radius of curvature of said sheet, $R_o$ is an innermost radius of curvature of said sheet, and t is a thickness of said sheet.

37. The method of claim 35, wherein said bight is laid on said sheet in a substantially circular pattern prior to wrapping said sheet.

* * * * *